Patented May 6, 1924.

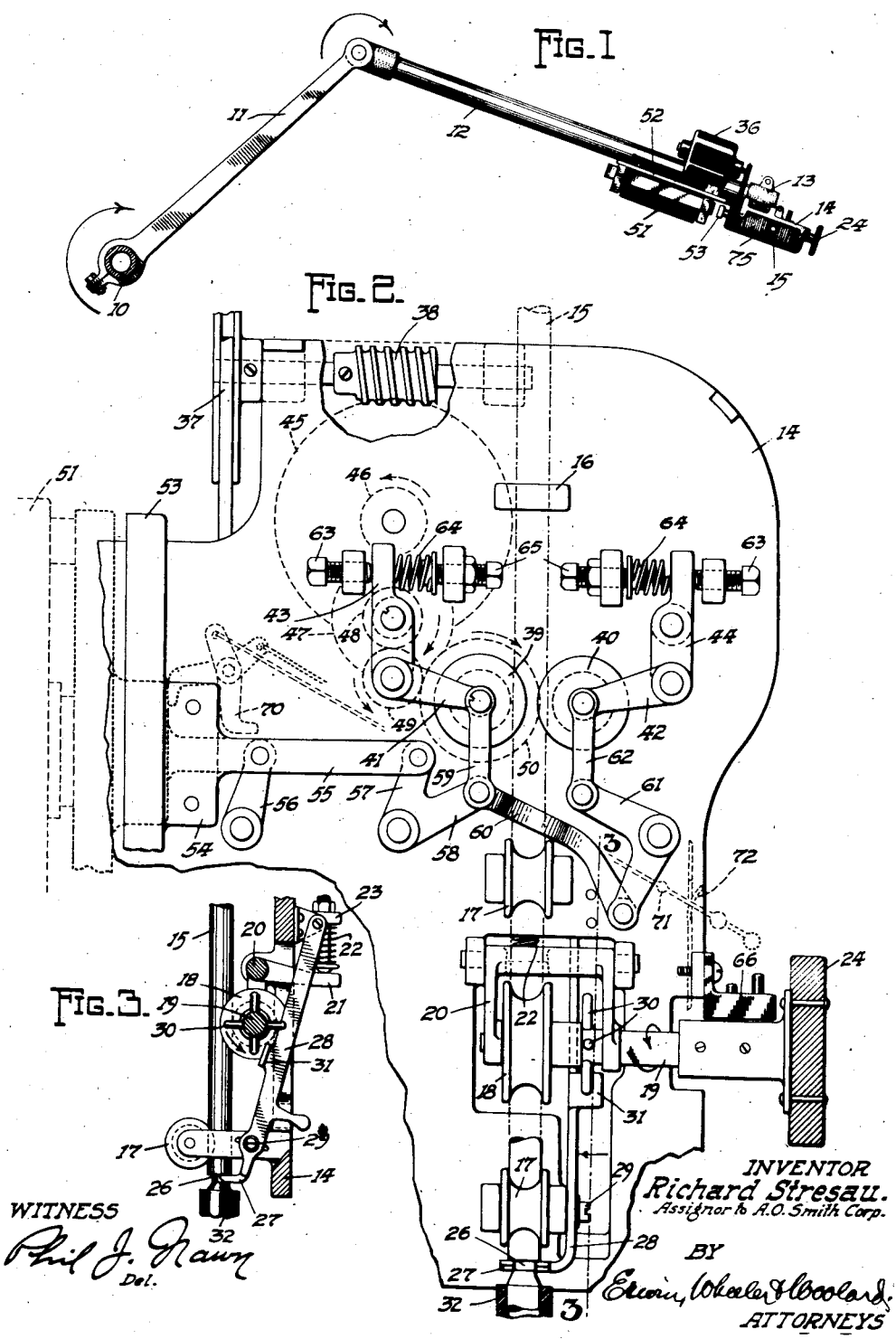

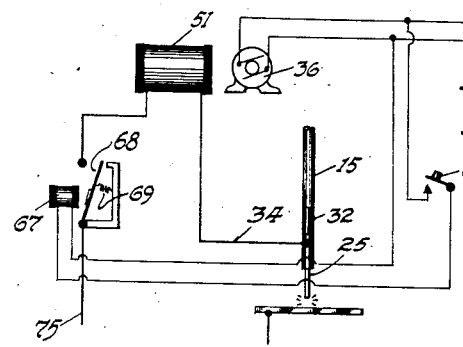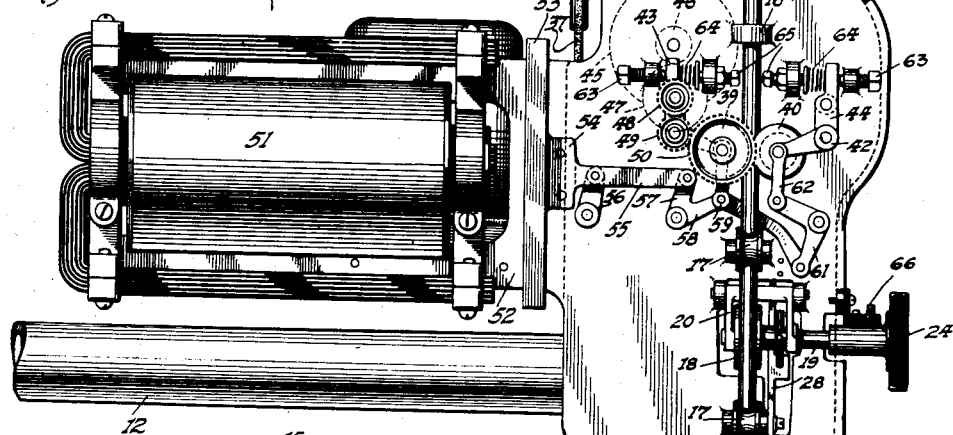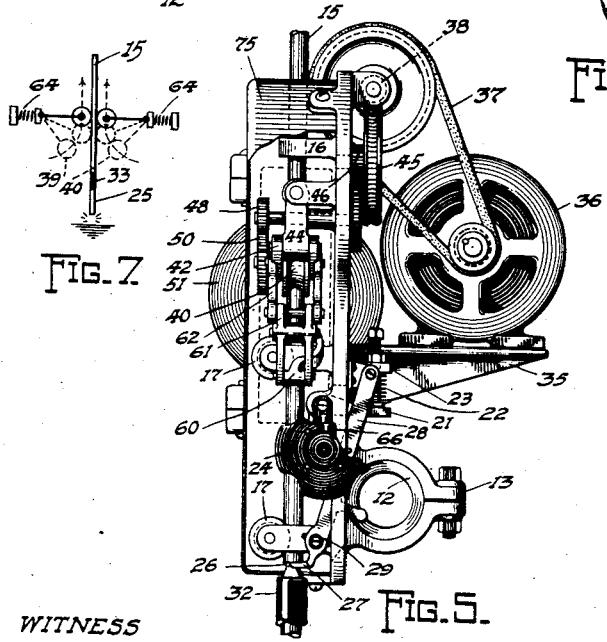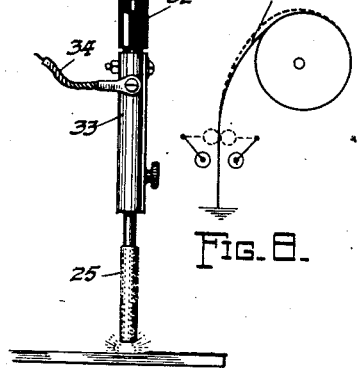

1,493,440

UNITED STATES PATENT OFFICE.

RICHARD STRESAU, OF WAUWATOSA, WISCONSIN, ASSIGNOR TO A. O. SMITH CORPORATION, OF MILWAUKEE, WISCONSIN, A CORPORATION OF NEW YORK.

PORTABLE ARC-WELDING APPARATUS.

Application filed November 20, 1920. Serial No. 425,380.

*To all whom it may concern:*

Be it known that I, RICHARD STRESAU, a citizen of the United States, residing in the city of Wauwatosa, county of Milwaukee and State of Wisconsin, have invented a certain new and useful Improvement in Portable Arc-Welding Apparatus; and I do declare the following to be a clear, exact, and complete description thereof, such as will enable persons skilled in the art to which the invention pertains to make and use the same, reference being had to the accompanying drawings as showing one form of construction in which my invention has been embodied.

My invention relates to the art of electric arc welding.

The invention, in its present embodiment, comprises a portable welding apparatus, which has been especially designed for general use in welding small parts. However, the principles of construction and operation residing in my present apparatus are such that the invention embodied therein is applicable to other classes of welding, as well as to heavier machines.

The invention resides in a construction in which the welding arc is struck by the automatic withdrawal of the fusible metallic weldrod from its point of contact with the work to be welded. The said weldrod, which transmits the welding current, is withdrawn to strike the arc through the energization of an electro magnet, which latter is within the welding circuit and which is excited as the point of the weldrod is brought into the described contact. The making of such contact serves also to close the break existing in the welding circuit, and to establish the welding current through the electro magnet and the fusible weldrod.

The invention also resides in a construction in which the devices actuated by the magnet and employed for withdrawing the weldrod to strike the arc, are also utilized as a means to feed the weldrod to the work in the ratio of the consumption of such weldrod, during the time that the welding current is flowing and as the welding proceeds.

The invention further resides in means herein shown as a pair of rollers which withdraw the weldrod to strike the welding arc and, in connection therewith, devices which operate through the said means to reverse the direction of movement of the weldrod and feed the latter to the welding line in the ratio of the fusion of the weldrod.

A small electric motor, mounted upon and constituting part of the portable apparatus, drives the devices for feeding the weldrod. Means have also been provided for rendering inoperative the devices for feeding the fusible weldrod when the latter has been consumed within the prescribed limits.

Means have also been provided for maintaining the engagement of the feeding means with the weldrod, in certain cases, after such feeding means have been brought into position for operation through the action of the electromagnet.

The term "weldrod", as used arbitrarily in the specification and claims of this case, is intended to apply to that type of electric current conductor formed as a metallic wire, of definite or indefinite length, which is progressively fused and completely consumed as the welding operation proceeds, by the metallic electric arc formed between the free end or point of the wire and the work upon which the welding is then being performed. In such welding operation, the wire constituting the weldrod is completely reduced by the heat generated in the electric arc, in the ratio of the feeding movement of the weldrod toward the work, and the molten metal flowing from the weldrod is deposited at and incorporated in the joint as additional welding material, thereby increasing the resistance of the joint to the tensile stresses to which it may be subjected. At the same time, the local areas of the parts to be welded are brought to a proper state of fusion by the action of the arc, so that a homogeneous weld is produced by the union of the metals. A distinction is thus made between the destructible weldrod and the usual carbon pencil or other form of current carrying electrode, which latter does not contribute additional welding material to the welded joint.

The present invention constitutes an improvement upon the arc welding apparatus disclosed in my application filed July 17, 1920, Serial No. 396,881, and which since the filing hereof has matured into Patent No. 1,407,900, granted February 28, 1922.

The novel features of my invention will be pointed out in the appended claims.

In the drawings which accompany this specification.

Figure 1 is a plan view showing the general arrangement of my improved portable welding apparatus.

Fig. 2 is an enlarged view in elevation, showing the hand operated devices for positioning the point of the weldrod with relation to the work to be welded, and also showing in detail the construction and arrangement of the devices which feed the weldrod during the welding operation.

Fig. 3 is a view on the line 3—3, Fig. 1, looking in the direction of the arrow, showing the means for locking the weldrod carrier in its elevated position, and also the means for releasing the said carrier so that the latter may be free to feed the weldrod, under the operation of the weldrod feeding devices.

Fig. 4 is a general view in elevation, of the welding mechanism, the details of which will be disclosed hereinafter.

Fig. 5 is a view from the right of Fig. 4, drawn to the same scale, but partly broken out, showing the relative arrangement of the driving motor and some other parts.

Fig. 6 is a diagrammatic view showing the wiring connections of the apparatus.

Fig. 7 is a diagrammatic view showing the movement of the weldrod feeding devices in withdrawing the weldrod to establish the arc.

Fig. 8 is a similar view showing the adaptation of the invention to use in connection with a continuous weldrod.

Referring to the drawings, which merely show but one embodiment of my invention, Figure 1, the fixed pivot post or stud 10 has adjustably mounted thereon a radial arm 11, to the free arm of which is pivotally attached one end of a rod 12, upon the other end of which the welding apparatus or head is secured by a clamp 13, or other means, which will permit the desired radial or longitudinal adjustment with relation to the supporting rod 12. The clamp 13 is attached to a frame 14, which latter with the elements supported thereby constitute the welding apparatus or head. The welding head, while movable in an operating plane which is parallel or substantially so with respect to the welding line, is relatively stationary with regard to the work to be welded, so as to maintain the constancy of the arc during the progress of welding.

A weldrod carrier 15 is guided for vertical or angular movement upon the front of the frame 14, such angular movement depending upon the radial adjustment of the clamp 13 upon the supporting rod 12. The said weldrod carrier 15 passes through a perforation in a guide 16 attached to the front of the frame 14 near the upper edge thereof, and its course is directed by means of grooved guiding rollers 17, spaced apart and supported in brackets upon the lower front side of the frame. In the construction shown, the rollers 17 are in vertical alignment, and the weldrod carrier is maintained in the grooves of the said pulleys 17 by means of a grooved feeding roller 18, supported upon the opposite side of the path of movement of the weldrod carrier, and bearing against the said carrier at a point between the grooved rollers 17.

The said grooved roller 18 is fixed to a shaft 19, rotating in bearings formed in a frame 20, pivoted to the frame 14, and which frame 20 with the roller 18 works in an opening in the said frame 14. The pivoted frame 20 is provided with an arm 21, extending through the said opening, and actuated in one direction to engage the roller 18 with the weldrod carrier, by the force of an expansion spring 22, Fig. 3, confined by a bracket 23 upon the rear of the frame 14. At its outer end the shaft 19 is provided with an insulated hand wheel 24, by the turning of which the weldrod carrier may be caused to have vertical reciprocation, due to the frictional engagement of the grooved roller 18 therewith. Thus the weldrod 25, supported by the carrier 15, may be caused to approach the work to be welded to position the point of the weldrod in relation thereto, or to be withdrawn therefrom, as may be necessary when it is desired to insert a fresh weldrod in the carrier. The weldrod carrier is notched or shouldered, as at 26, for the reception of the bent end 27, of a lever 28 pivoted at its upper end to the bracket 23, and working in the opening in the frame 14, before referred to. The lower end of the lever 28 is provided with a pin 29, which works in a slot formed in the bracket supporting the lower guiding roller 17. The purpose in providing the shoulder 26 for engagement by the end 27 of the lever 28, is to enable the weldrod carrier 15 to be maintained in elevated position when it becomes necessary to insert a fresh weldrod.

Coincidently with the rotation of the hand wheel 24, to impart a downward movement to the weldrod carrier 15, to bring the point of the weldrod into contact with the work to strike an arc and establish the welding circuit, disengagement of the lever 28 from the shoulder 26 of the said carrier, is effected by means of a pointed cam wheel 30, fixed upon the shaft 19, the points of such cam wheel acting upon a wear plate 31, formed upon the lever 28.

The weldrod carrier 15 is provided at its lower end with an insulated coupling 32, which in turn is provided at its other end with a connector or holder 33, through which the welding current is transmitted by means of connection 34. The lower end of the connector of holder 33 is bored for the reception of the bare end of the metallic weldrod 25, and secured therein by means of a thumbscrew, and as now commonly practiced in the electric welding art.

A bracket 35, attached to the rear of the frame 14, supports a small constantly driven electric motor 36, which through suitable pulleys and connecting belt 37, or other means, drives a worm 38 fixed upon a shaft journalled in bearings on the frame 14.

The gudgeons of the grooved rollers 39 and 40, which have as one of their functions that of feeding the weldrod, are journalled in the free ends of floating links 41 and 42, which are attached to the lower arms of levers 43 and 44, pivotally mounted between their ends upon the frame 14. The worm 38, previously referred to, drives a worm gear 45, rotating about a fixed point on the frame 14. A pinion 46 attached to the gear 45 is in engagement with a gear 47 mounted to rotate upon the pivot of the arm 43. A reducing pinion 48, mounted to rotate with the gear 47, engages an idler 49 mounted to rotate upon the pivotal connection between the link 41 and the lever 43. The idler 49 is in engagement with a gear 50, rotating with the grooved roller 39, so that when the grooved rollers 39 and 40 are brought into frictional engagement with the weldrod carrier 15, the latter will be fed down through the operation of the motor 36, through the rotation of the said rollers 39 and 40, the former of which is constantly driven.

An electro magnet 51 is supported upon an extension 52 of the frame 14, and is adapted to attract the armature 53, when the coils of the magnet are energized by the passing of an electric current therethrough,—in the present instance, the welding current. The said armature is provided with a hub 54, from which extends a bar 55. The armature 53, through the bar 55, is supported in space at the free ends of parallel levers 56 and 57, pivotally mounted on the frame 14. The manner of connecting the bar 55 of the armature to the supporting levers 56 and 57, insures a parallel motion of the armature under the influence of the magnetic attraction created in the coil. The lever 57 referred to may be provided with a branch 58, to the free end of which is connected a link 59, the other end of which is connected to the floating pivot of the feeding roller 39. A second link 60 is likewise connected to the free end of arm 58 of the lever 57, and at its other end to one arm of a bell crank lever 61, pivoted upon the frame 14. The other arm of the bell crank is connected by means of a crank 62 to the floating pivot of the grooved roller 40.

Set screws 63, passing through lugs formed upon the frame 14, and bearing upon the outer faces of the upper arms of levers 43 and 44, are adapted to limit the approach of the grooved feeding rollers 39 and 40, when such limit is not determined by the presence of the weldrod carrier 15 therebetween. Suitable springs 64 confined between the opposite sides of the upper ends of levers 43 and 44 and regulating screws 65, will through their compression, enable the armature 53 to receive its full movement under attraction by the electro magnet 51, and through their expansion will cause the feeding rollers 39 and 40 to engage the weldrod carrier 15 with a degree of friction which will act as a positive feed to the said carrier, as the said rollers 39 and 40 are rotated. The said springs will also compensate for any irregularities of movement which may occur in the passage of the weldrod carrier 15 between the rollers 39 and 40, without impairing such frictional engagement.

In the operation of my invention, a weldrod 25 will be supplied to the connector or holder 33, depending from the weldrod carrier 15. The closing of the switch 66 in a branch of the motor circuit, will energize the magnet 67, by the movement of the armature 68, acting as a switch to close a gap in the welding circuit 75. The weldrod carrier will be caused to descend by the rotation of the hand wheel 24, until the point of the weldrod is brought into contact with the work to be welded, and which is within the welding circuit. Upon such contact being made, the circuit is completed and the welding current is established, such current, as before stated, traversing the electro magnet 51, and energizing the latter. The magnetic attraction thus created will draw the armature 53, and through the links and levers connected to and operated by the bar 55 of the armature, will swing the grooved feeding rollers 39 and 40 upwardly and toward each other, and into gripping engagement with the weldrod carrier 15, to withdraw the point of the weldrod from contact with the work and strike the welding arc. The motor 36, which is running the while, through the intermediate gearing previously described, will now transmit the rotating movement of the grooved rollers 39 and 40, to the weldrod carrier 15, so as to impart a reverse or feeding movement thereto.

The distance through which the grooved rollers 39 and 40 move in withdrawing the weldrod will be such as to establish a welding arc of appropriate length, and which latter will be maintained as the fusible weldrod is fed to the work. By the operation of the device as described, the arc between the weldrod and the work is automatically established, and coincidentally therewith the fusing of the weldrod and the forward feeding of the latter take place as the welding proceeds. Within the limits of the construction illustrated, and as described, the feeding of the weldrod and the fusing thereof will be continued until the weldrod is consumed. The work to be welded will be arranged in a plane approximately parallel to the path of movement of the welding head thereon, so that an arc of constant value will be maintained.

To insure the engagement of the feeding rollers 39 and 40 with the weldrod carrier 15, in case an alternating current is used for welding, I may employ a locking device, which may be in the form of a lever 70, Fig. 2, pivoted to the frame 14, and bearing with one end against the hub 54 of the armature. The other end of the lever 70 is connected to a latching device 71, adapted to be engaged by a stop 72 upon the frame 14. By pulling upon the connection between the latching device and the lever 70, the latter will be rotated so as to engage the hub 54 of the armature 53 and prevent the outward movement thereof under the weight of the parts associated with the feeding rollers 39 and 40, when the alternating current crosses the zero line. But the latching device need not be used when a direct current is employed for welding.

In order to prevent the further feeding of the weldrod as the latter reaches a predetermined state of consumption, I form a circumferential depression 73 about the upper end of the weldrod carrier 15, into which depression the rollers 39 and 40 may pass and be restrained from further feeding engagement with the carrier 15, by means of set screws 63 above described. I also provide a stop pin 74 in the upper end of the said carrier, which stop pin is adapted to be brought into engagement with the guide 16 upon the frame 14, and thus arrest the downward movement of the weldrod carrier, and prevent further movement thereof, when the feeding rollers 39 and 40 pass into the depression 73.

As indicated diagrammatically in Fig. 7, the arcs through which the feeding rollers 39 and 40 pass in their upward movement will be so proportioned as to withdraw the point of the weldrod from its contact with the work and strike a welding arc of suitable length when the welding circuit is completed. The operation of thus withdrawing the weldrod for the purpose of striking an arc between its fusing end and the work to be welded, is not, however, limited in its application to use in connection with weldrods of short lengths. The operation may be employed in connection with continuous weldrods, which, as is now known in this art, involves the use of weldrod material drawn from a reel, about which a weldrod of exceeding length is coiled. In making application of the invention in the manner last described, it is arranged that the coil supporting the continuous weldrod be placed somewhat at one side of the line of travel of the weldrod, in order that the length of weldrod between the coil and the feeding rollers may be displaced in a vertical direction, by reason of its flexibility without encountering the resistance which exists if a direct thrust in withdrawing the weldrod to establish the arc is made. The operation is indicated in Fig. 8, in which the dotted line 71 indicated the freedom of movement referred to, when the weldrod is withdrawn to establish the arc between the point thereof and the work to be welded.

The initial movement of the normally separated rollers 39 and 40 through converging arcuate paths ceases when the said rollers are brought into engagement with the weldrod carrier 15. This movement, however, is not coextensive with the movement of the armature 53, and it follows that in completing this movement, the armature acts with a force which will compress the springs 64, as the rollers complete their upward movement. This action will exert a gripping pressure upon the carrier 15, and effect the withdrawal of the point of the weldrod from its contact with the work to be welded. The initial arcuate and further parallel movements of the rollers 39 and 40 are shown diagrammatically in Fig. 7.

When the end of the welding line has been reached, the switch 66 may be thrown to break the welding circuit, and discontinue the feeding movement of the weldrod. A spring 69, attached to the armature 68, will withdraw the said armature so as to open the welding circuit at that point, a situation which will continue until the switch 66 is reversed for another operation. The weight of the feeding rollers 39 and 40, and their connections, will automatically disengage the said rollers from the weldrod.

A covering 76, attached to and supported by the frame 14, may be used to encase the feeding devices supported upon the welding head.

In some of the appended claims, as well as at places in this specification, I refer to the feeding devices as acting upon the weldrod, but I wish this reference to be understood as applying both to the carrier 15, which is supplied with a weldrod, and to the weldrod as well, inasmuch as the same plan of operation is applicable to either arrangement. When the weldrod supplied by the welding head is of the continuous type, the retaining devices 27 and 28 will be without function, and no provision of the shoulder 27 and reduced portion 69, with which the carrier 15 is provided, will be made in connection with the use of a continuous weldrod.

The references in some of the claims to "the work" relate to the work which is to be welded, and which, in the embodiment of the invention shown, is embraced within the welding circuit.

Modifications of the construction shown may be made without departing from the spirit of my invention.

Having thus described my invention, what I claim and desire to secure by Letters Patent of the United States, is:

1. In an arc welding apparatus, a pair of weldrod feeding rollers, an electromagnet and connections from the armature thereof to move the feeding rollers into engagement with the weldrod and withdraw the latter from contact with the work to strike a welding arc.

2. In an arc welding apparatus, a pair of feeding rollers arranged upon opposite sides of the line of travel of the weldrod, means for supporting the said rollers for movement in converging arcuate paths, and means for moving the rollers as described to withdraw the weldrod from contact with the work to strike a welding arc.

3. In an arc welding apparatus, a pair of oppositely arranged weldrod feeding rollers, a floating pivot construction supporting the said rollers, and means for moving the said rollers in converging paths to grasp the weldrod to withdraw the latter from contact with the work and strike a welding arc.

4. In an arc welding apparatus, a pair of yieldingly mounted rollers for feeding the weldrod to the work to be welded in the ratio of the fusion of the weldrod, in combination with means for rotating the said rollers to produce such feeding movement.

5. In an arc welding apparatus, a welding head, a weldrod carrier guided thereon, a pair of pivotally mounted rollers adapted to engage the carrier and feed the weldrod to the work to be welded, stops for arresting the relative approach of the rollers, and means for relieving the weldrod carrier from the feeding pressure of the said rollers when a predetermined length of the weldrod has been fused.

6. In an arc welding apparatus, a welding head, a weldrod carrier mounted for longitudinal movement thereon, and having its diameter reduced for a portion of its length, a pair of feeding rollers having a spring pressed engagement with the said carrier, and stops for limiting the movement of the said rollers toward each other, whereby the feeding rollers cease to grip the carrier when a predetermined amount of weldrod has been consumed.

7. In an arc welding apparatus, a weldrod carrier having its diameter reduced in one portion of its length, spring-pressed rollers engaging the said carrier, means for actuating the said rollers to feed the weldrod to the work, and stops to prevent engagement of the feeding rollers with the said carrier when the reduced portion thereof passes between the feeding rollers.

8. In an arc welding apparatus, a welding head, a weldrod carrier guided thereon, means for retaining the said carrier in its retracted position, while a weldrod is placed in the carrier, and means for releasing the said retaining means, and for advancing the carrier to bring the point of the weldrod into contact with the work.

9. In an arc welding apparatus, a welding head, a fusible metallic weldrod guided thereon, an electromagnet and means positioned by the armature thereof for withdrawing the weldrod to strike a welding arc, in combination with means to actuate the said withdrawing means to feed the weldrod in the ratio of the consumption thereof, and a switch for closing the circuit to energize the said magnet.

10. In an arc welding apparatus, a welding head, provided with guides for directing the movement of a metallic weldrod, a pair of feeding rollers supported upon the said head, means for moving the said rollers into engagement with the weldrod and withdraw the latter from contact with the work and strike a welding arc, in combination with means for driving the said rollers to feed the weldrod to the work in the ratio of the fusion of the weldrod.

11. In an arc welding apparatus, a welding head, a pair of feeding rollers pivotally supported thereon, an electromagnet for moving the said rollers bodily into engagement with the weldrod to withdraw it from contact with the work to strike a welding arc, and means on the said head for rotating the rollers to reverse the direction of movement of the weldrod and feed the latter to the work in the ratio of the fusion of the weldrod.

12. In an arc welding apparatus, a welding head, a weldrod guided thereon, a pair of oppositely arranged feeding rollers normally out of contact with the weldrod, an electromagnet with connections therefrom to engage the rollers with the weldrod and withdraw the latter from contact with the work to strike a welding arc, and means for rotating the rollers in their retracted position to feed the weldrod in the ratio of the fusion of the latter.

13. In an arc welding apparatus, a pair of pivotally mounted rollers adapted to be brought into engagement with a weldrod, and means for effecting such engagement to move the weldrod in one direction to establish a welding arc, in combination with means for driving the said rollers to reverse the movement of the weldrod and feed the latter to the work in the ratio of the fusion of the weldrod.

14. In an arc welding apparatus, a pair of bodily movable feeding rollers, means for moving said rollers to withdraw the metallic weldrod from contact with the work to strike a welding arc, and other means for actuating the said rollers to feed the weldrod to the work in the ratio of the fusion of the weldrod.

15. In an arc welding apparatus, a welding head provided with guiding means for directing the weldrod, devices for withdrawing the weldrod to strike an arc between the point of the latter and the work, in combination with means acting through the withdrawing devices to feed the weldrod to the work in the ratio of the fusion of the weldrod.

16. In an arc welding apparatus, a pair of feeding rollers for the metallic weldrod, means to move the said rollers bodily to withdraw the weldrod to strike a welding arc, and means for moving the said rollers rotatively to feed the weldrod to the work in the ratio of the fusion of the weldrod.

17. In an arc welding apparatus, a welding head, a pair of weldrod feeding rollers pivotally supported thereon, an electromagnet for lifting the said rollers into feeding engagement with the weldrod, and means for maintaining such engagement during the pulsation of the current in the magnet.

18. In an arc welding apparatus, a welding head, a pair of normally separated weldrod feeding rollers, pivotally supported thereon, an electromagnet and connections from the armature thereof to the said rollers, whereby the latter are moved toward each other to grip the weldrod when the magnet is energized, and means for actuating the said rollers to feed the weldrod to the work as the weldrod is fused.

19. In an arc welding apparatus, a pair of weldrod feeding rollers, normally spaced apart from the weldrod, means for initially moving the said rollers into gripping engagement with the weldrod and further moving them to withdraw the weldrod from contact with the work to strike a welding arc.

20. In an arc welding apparatus, an electromagnet within the welding circuit for withdrawing the weldrod from its contact with the work to strike a welding arc, in combination with a pair of feeding rollers moved bodily by the magnet, to withdraw the weldrod, and means for actuating the said rollers to feed the weldrod in the ratio of the fusion of the latter.

21. In an arc welding apparatus, a pair of movable feeding rollers, an electromagnet in the welding circuit to engage the said rollers with the weldrod and withdraw it to strike an arc when contact is made with the work, in combination with means including the said rollers to reverse the direction of movement of the weldrod and feed the latter in the ratio of the consumption thereof.

In testimony whereof, I have signed my name at Milwaukee, this 18th day of November, 1920.

R. STRESAU.

Witnesses:
W. F. WOOLARD,
JAS. L. ADAMS, Jr.